US008171833B2

(12) United States Patent
Felton

(10) Patent No.: US 8,171,833 B2
(45) Date of Patent: May 8, 2012

(54) RAIL SYSTEM CHEESE CUTTER

(76) Inventor: John Reed Felton, Wauwatosa, WI (US)

( * ) Notice: Subject to any disclaimer, the term of this patent is extended or adjusted under 35 U.S.C. 154(b) by 371 days.

(21) Appl. No.: 12/617,941

(22) Filed: Nov. 13, 2009

(65) Prior Publication Data
US 2011/0113938 A1 May 19, 2011

(51) Int. Cl.
B26D 1/30 (2006.01)
(52) U.S. Cl. ....... 83/200.1; 83/307.1; 83/607; 83/651.1; 83/932; 30/116; 99/537
(58) Field of Classification Search ...... 83/307.1–307.3, 83/200.1, 607–609, 651, 651.1, 581.1, 932, 83/522.16, 697, 13; 30/116, 117; 99/537
See application file for complete search history.

(56) References Cited

U.S. PATENT DOCUMENTS

| 1,796,212 A | 3/1931 | Nadeo | |
| 2,472,699 A * | 6/1949 | Gangemi | 83/651.1 |
| 2,592,657 A * | 4/1952 | Cierley | 83/543 |
| 3,509,628 A | 5/1970 | Carturan | |
| 3,561,511 A * | 2/1971 | Kummer | 83/597 |
| 3,766,817 A | 10/1973 | Aby et al. | |
| 4,195,402 A * | 4/1980 | Leffer | 30/114 |
| 4,516,458 A | 5/1985 | Pomerantz et al. | |
| D327,486 S | 6/1992 | Watanabe | |
| D339,271 S | 9/1993 | Burris | |
| 7,249,550 B1 * | 7/2007 | Thune, Jr. | 83/599 |
| 2010/0175568 A1 * | 7/2010 | Fritz-Jung et al. | 99/537 |

* cited by examiner

Primary Examiner — Phong Nguyen
(74) Attorney, Agent, or Firm — Absolute Technology Law Group, LLC

(57) ABSTRACT

The present invention is a rail system cheese cutter comprised of an arched cutting surface, rail and cutting arm with a removable cutting wire and tension adjustment component which allows the user to adjust the tension of the wire. The rail has a milled portion where the cutting arm is to be attached to the rail. One end of the cutting arm has a rotational bearing with a slot and opening. The slot is slid around the milled portion of the rail until the rail rests in the opening of the rotational bearing. Once attached, the cutting arm can be pivoted around the rail and moved laterally along the rail allowing the user to uniformly cut or slice a food item without moving it.

13 Claims, 9 Drawing Sheets

RAIL SYSTEM CHEESE CUTTER

FIELD OF INVENTION

The present invention relates to the field of equipment for preparing food and more particularly to cheese cutters.

BACKGROUND

Nearly 10 billion pounds of cheese are produced each year in the United States, and consumers may select from thousands of cheese cutting utensils and accessories. Cheese cutting accessories are sold in most kitchen and gourmet food stores, and are available at varying price points. For example, the website www.nextag.com currently lists fourteen cheese cutting devices, including handheld wires.

Wires are highly effective for cutting cheese because the wires have less surface area than knives and cut through most cheeses quickly and cleanly. However, wires are difficult to grasp with bare hands. When mounted in tools, wires may be difficult to remove or clean, and may stretch or break rendering a device inoperable.

Example of wire cheese slicers are taught by U.S. Pat. No. 1,796,212 (Nadeo '212) and U.S. Pat. No. 3,766,817 (Aby '817). Nadeo '212 and Aby '817 teach a food slicer that uses a high-tension wire held between two ends of a U-shaped frame or yoke. The food to be sliced is placed on the base and the yoke is pivoted downwards. As the yoke is pivoted, the wire is forced through the food item. This devices taught by Nadeo '212 and Aby '817 require the food item to be moved and repositioned as it is sliced. In addition, the devices are not easily disassembled for cleaning or replacing of the wire.

It is desirable to have a wire cheese slicer that does not require the user to repeatedly move a block of cheese (or other food item) as it is sliced.

It is further desirable to have a utensil which allows a wire to be easily grasped and manipulated.

It is further desirable to have a wire component that can easily be removed from a cheese slicing apparatus.

It is further desirable to have a wire cheese slicer that is capable of allowing a user to cut highly uniform cheese (or other food item) of desired dimensions.

It is further desirable to have a wire cheese slicer which has a wire that is capable of cutting a variety of food items.

SUMMARY OF THE INVENTION

The present invention is a rail system cheese cutter apparatus which enables a user to efficiently grasp and position wire over cheese (or other food items) cutting the cheese to desired dimensions without moving the cheese. In the embodiment shown, wire is tension-adjustable and is easily removed for cleaning or replacement.

In various embodiments, rail system cheese cutter apparatus is comprised of an arched cutting surface, rail and cutting arm with a removable cutting wire and tension adjustment component which allows the user to adjust the tension of the wire. The rail has a milled portion where the cutting arm is to be attached to the rail. One end of the cutting arm has a rotational bearing with a slot and opening. The slot is slid around the milled portion of the rail until the rail rests in the opening of the rotational bearing. Once attached, the cutting arm can be pivoted around the rail and moved laterally along the rail allowing the user to uniformly cut or slice a food item without moving it.

Glossary

Figure 1A:
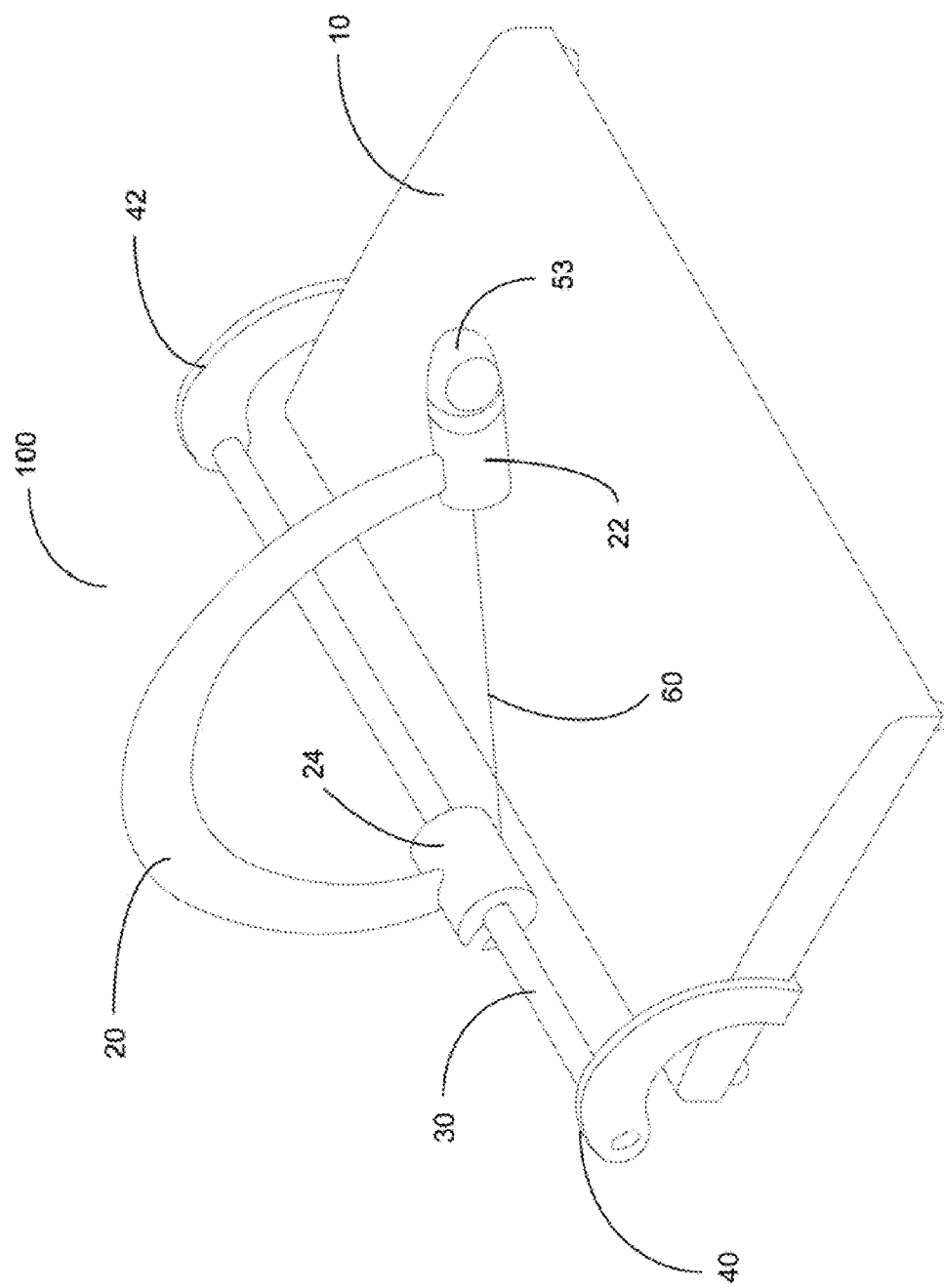
FIG. 1a is a front perspective view of a rail system cheese cutter apparatus.

As used herein, the term "arched" refers to a structure having a crowned, curved or bowlike appearance to which a tension wire will conform when downward pressure is applied.

As used herein, the term "cutting surface" refers to the surface upon which cheese or another food item is cut by a wire or other cutting instrument.

As used herein, the term "feet" refers to a support member upon which a cutting surface rests.

As used herein, the term "gripping component" refers to a component that is anthropometrically or ergonomically designed to be grasped and/or held by a user. For example a gripping component may include contours, indentations and textures to facilitate grasping and rotating.

As used herein, the term "integral" refers one or more components that make up a unit or whole.

As used herein, the term "milled portion" refers to a part of a component that is flattened, pressed, cut off or otherwise machined or molded so that the milled portion is of a non-uniform dimension relative to the component as a whole (e.g., a narrowed portion adapted to be inserted in an aperture).

As used herein, the term "plug weld" or "plug welding" refers to a process of joining one metal part with a circular hole to another metal part positioned directly beneath or adjacent to it.

As used herein, the term "rise" refers to an increase in height (e.g., the rise on an arched cutting surface.

As used herein, the term "spherical mass" refers a mass of material integral to a wire that allows the ends of the wire to be secured in an aperture, slot or other component adapted to receive a wire.

As used herein, the term "rail system" means a system where a cutting component moves along a horizontal axis (rail) to control the cutting dimensions without requiring the food that is being sliced to be moved.

As used herein, the term "measurement indicia" means markings or measuring proportions (e.g., along a rail, cutting surface or other component).

DETAILED DESCRIPTION OF INVENTION

For the purpose of promoting an understanding of the present invention, references are made in the text to exemplary embodiments of a rail system cheese cutter, only some of which are described herein. It should be understood that no limitations on the scope of the invention are intended by describing these exemplary embodiments. One of ordinary skill in the art will readily appreciate that alternate but functionally equivalent materials, shapes and components may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1a is a front perspective view of rail system cheese cutter apparatus 100, which enables a user to efficiently grasp and position wire 60 over cheese (or other food items), cutting to desired dimensions without moving the cheese. In the embodiment shown, wire 60 is tension-adjustable and easily removed for cleaning or replacement.

Rail system cheese cutter apparatus 100 is comprised of arched cutting surface 10, cutting arm 20 and rail 30 (not visible). Also visible are gripping component and wire tensioning knob 53, gripping component attachment member 22, wire 60, rotational bearing 24, left rail bracket 40 and right rail bracket 42.

In the embodiment shown, arched cutting surface 10 is Corian®. In other embodiments, arched cutting surface 10 may be made of marble, acrylic, plastic, glass, wood, granite, or any other natural or synthetic material or composite. In the embodiment shown, arched cutting surface 10 is 0.75 inches thick with a rise of 0.150 inches and is made by machining or molding. In other embodiments, arched cutting surface 10 has a thickness that is lesser or greater than 0.75 inches and/or as a smaller or higher rise.

In the embodiment shown, the underside of arched cutting surface 10 has bores 12a, 12b, 12c, 12d (not shown) adapted to receive screws, bolts, pins, fasteners or other attachment means for attaching left rail bracket 40 and right rail bracket 42 to arched cutting surface 10. In the embodiment shown, bores 12a, 12b, 12c, 12d are threaded, but in other embodiments may be bonded, contoured, cast in place or omitted in favor of a hollow chamber through which a component is inserted or captured. In other embodiments, there may be a fewer or more bores and the bores may be in varying locations.

In the embodiment shown, rail 30 is approximately 10 inches long, but may be of varying lengths and may be scaled to fit arched cutting surface 10 having varied dimensions.

Figure 1B:
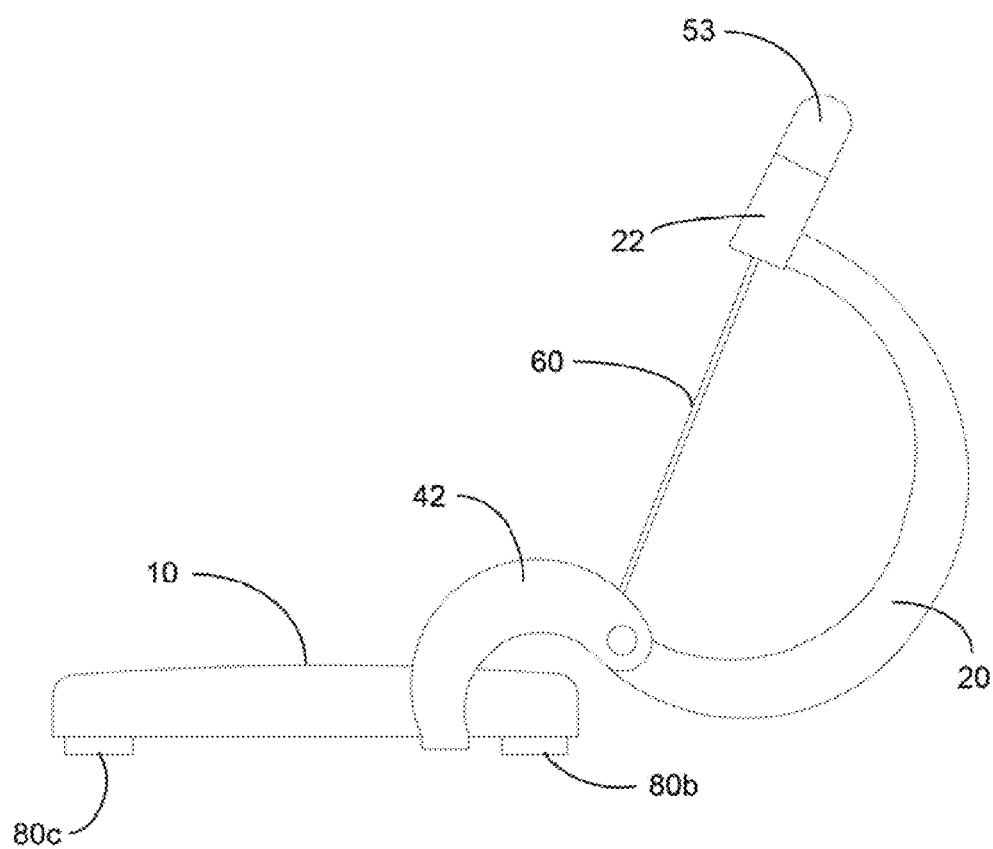
FIG. 1b illustrates a side view of a rail system cheese cutter apparatus.

FIG. 1b is a side perspective view of rail system cheese cutter apparatus 100.

Figure 2:
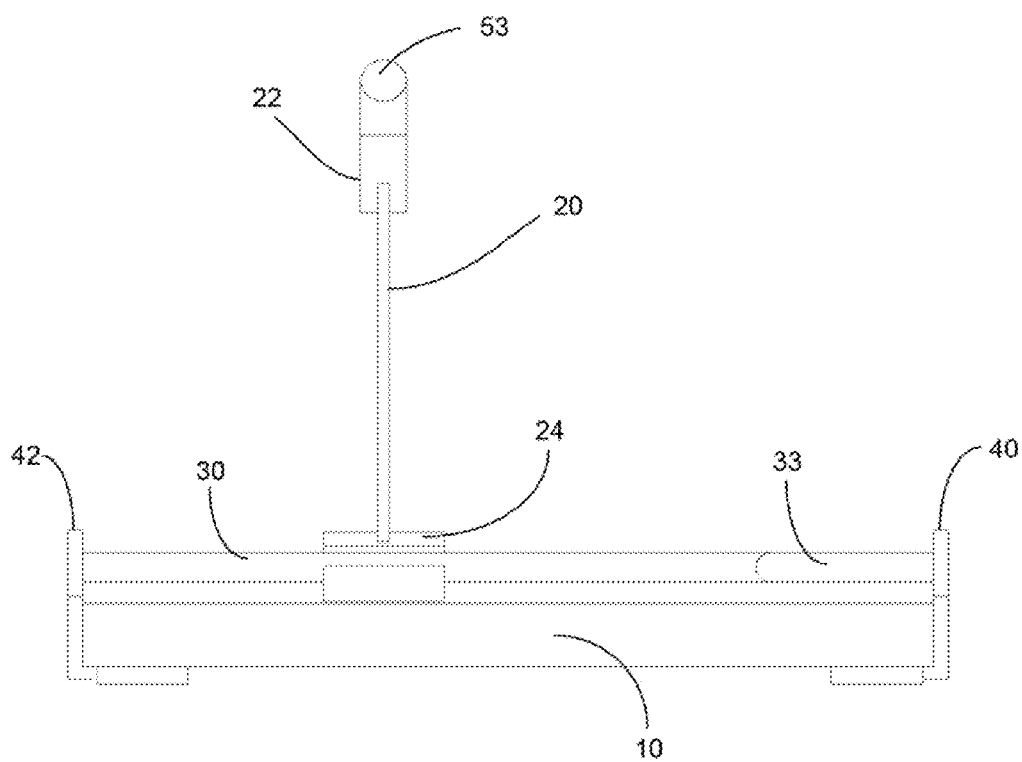
FIG. 2 illustrates a back perspective view of a rail system cheese cutter apparatus.

FIG. 2 illustrates a back perspective view of rail system cheese cutter apparatus 100. In the embodiment shown, cutting arm 20 is suspended in the air. Rail 30 has milled portion 33 which is thinner than the rest of rail 30. In the embodiment shown, rail 30 is attached to arched cutting surface 10 by left rail bracket 40 and right rail bracket 42.

Figure 3:
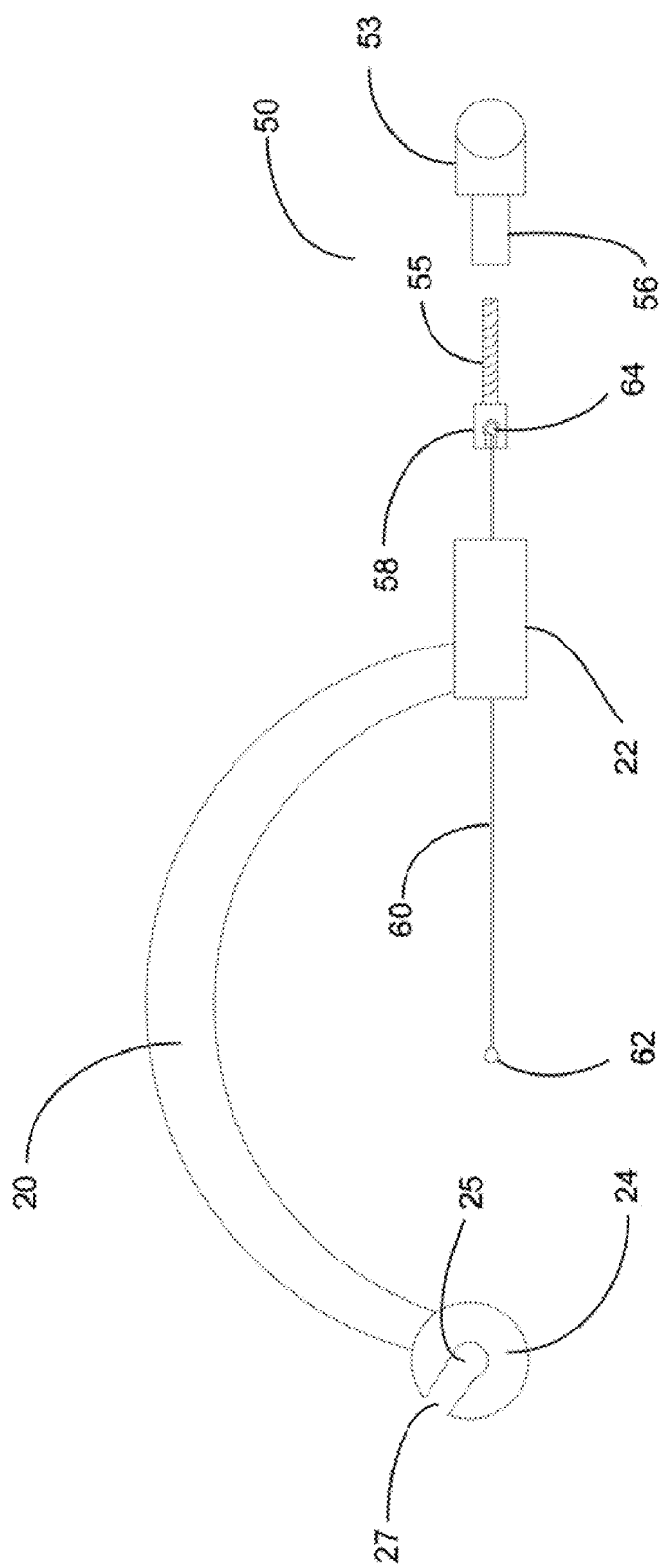
FIG. 3 illustrates an exploded view of a cutting arm, wire and wire tensioning components of a rail system cheese cutter apparatus.

FIG. 3 illustrates an exploded view of cutting arm 20, wire 60 and wire tensioning device 50 that is comprised of wire receptor 58, wire tensioning screw 55 and gripping component and wire tensioning knob 53. In various embodiments, gripping component and wire tensioning knob 53 could be separate and/or integral components. Gripping component and wire tensioning knob 53 may include ergonomic contours, textures and other features that facilitate grasping (e.g., a narrowed portion for grasping and/or rotating with a thumb and forefinger). Gripping component and wire tensioning knob 53 is a novel component used both for grasping and controlling a wire mount component (cutting arm 20) and for adjusting the tension of wire 60.

Attached to one end of cutting arm 20 is rotational bearing 24 having slot 27 and opening 25 which is adapted to receive rail 30 and allows cutting arm 20 to move horizontally along rail 30 and rotate about rail 30 (i.e., allows movement along two distinct axes). In the embodiment shown, rotational bearing 24 is circular, but in other embodiments, may be of another shape, such as semi-circular, oval, square or triangular.

Slot 27 has a width which accommodates the thickness of milled portion 33, but is thinner than rail 30. Diameter of opening 25 is greater than the width of slot 27 to accommodate rail 30. To attach cutting arm 20 to rail 30, slot 27 of rotational bearing 24 is slid around milled portion 33 until milled portion 33 rests in opening 25 of rotational bearing 24. Cutting arm 20 can then be rotated and slid along rail 30 securing cutting arm 20 to rail 30 as shown in FIG. 2. To remove cutting arm 20 from rail 30 for washing or storage, cutting arm 20 is slid along rail 30 to milled portion 33 and rotated so that milled portion 33 can be slid through opening 27.

In the embodiment shown, cutting arm 20 is cast or fabricated and is made of stainless steel. In other embodiments, cutting arm may be made of another type of iron, aluminum or other metal, plastic, or any other material or combinations thereof.

Attached to the other end of cutting arm 20 is gripping component attachment member 22 which is adapted to receive wire tensioning device 50 and through which wire 60 is inserted. One end of wire 60 is wrapped around spherical mass 62 and the other end of wire 60 is wrapped around integral spherical mass 64. Integral spherical mass 64 is secured inside an aperture in wire receptor 58. In the embodiment shown, wire receptor 58 is rectangular and the inside of gripping component attachment member 22 has square aperture 44 (not visible) which corresponds to the shape of wire receptor 58. Square aperture 44 allows wire 50 to be tensioned without being torqued or rotated within gripping component attachment member 22. Wire receptor 58 may be made from plastic, aluminum, wood, metal, or composite and may be any shape which corresponds to the shape of an aperture in gripping component attachment member 22.

Attached to the opposite end of wire receptor 58 from integral spherical mass 64 is wire tensioning screw 55. Wire tensioning screw 55 has threads that correspond to internal threads of elongated member 56 of gripping component and wire tensioning knob 53.

In the embodiment shown, gripping component and wire tensioning knob 53 is made of aluminum and has an indentation on each side for the user's thumb and forefinger. In other embodiments, gripping component and wire tensioning knob 53 may be made of wood, rubber, plastic or another material that is comfortable to grip and may or may not have indentations.

To secure wire 60 to cutting arm 20, gripping component and wire tensioning knob 53 is threaded onto the end of wire tensioning screw 55. Leading with spherical mass 62, wire 60 is inserted through square aperture 44 in gripping component attachment member 22 so that wire receptor 58 engages with square aperture 44.

Spherical mass 62 is placed so that it rests in cavity 26 (not visible) in rotational bearing 24. Gripping component and wire tensioning knob 53 is then screwed further onto wire tensioning screw 55 until wire 60 has the desired amount of tension. Wire receptor 58 remains stationary inside gripping component attachment member 22 which allows tightening of wire 60 without the turning of wire 60. When wire 60 is tight, integral mass 62 is held inside cavity 26 by the tension of wire 60 and elongated member 56 is entirely housed within gripping component attachment member 22.

Figure 4A:
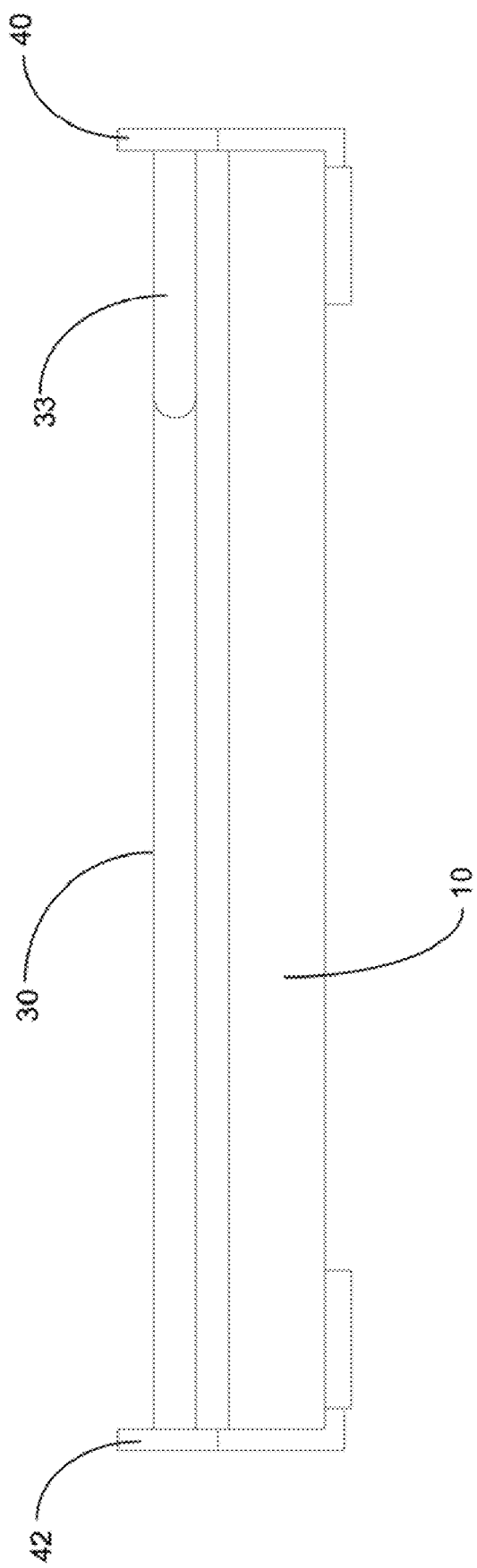
FIG. 4a illustrates a front perspective view of a rail of a rail system cheese cutter apparatus.

FIG. 4a illustrates a front view of rail 30 having milled portion 33 of rail system cheese cutter apparatus 100. Also visible are arched cutting surface 10, right rail bracket 42 and left rail bracket 40.

Rail 30 is attached to arched cutting surface 10 by right rail bracket 42 and left rail bracket 40. Right rail bracket 42 and left rail bracket 40 are mirror images of each other and are adapted to receive opposite ends of rail 30. Right rail bracket 42 and left rail bracket 40 are secured to the bottom of arched cutting surface 10 using screws, bolts, pins, fasteners or other attachment means.

In the embodiment shown, one end of rail 30 is plug welded into a circular hole in left rail bracket 40. Rail 30 is attached to right rail bracket 42 by inserting rail 30 into a hole of similar diameter in right rail bracket 42. In other embodiments, rail 30 is attached to arched cutting surface 10 by a functionally equivalent means known in the art, such as set screws, interlocking components, formed pockets, threaded attachments, spring-loaded plungers, pins, or integral molding or machining.

In various embodiments, rail 30 may be indexed by markings, notches and/or mechanical means to aid the user in uniformly cutting slices of cheese or other food items to the desired thickness. In the embodiment shown, rail 30 is approximately 10 inches long with approximately 2 inches of milled portion 33. In other embodiments, rail 30 and milled portion 33 may be of varying lengths and may be scaled to any level. In the embodiment shown, rail 30 is rounded with a flattened "cut out" milled portion 33 and has a diameter of approximately 5/16 inch.

Figure 4B:
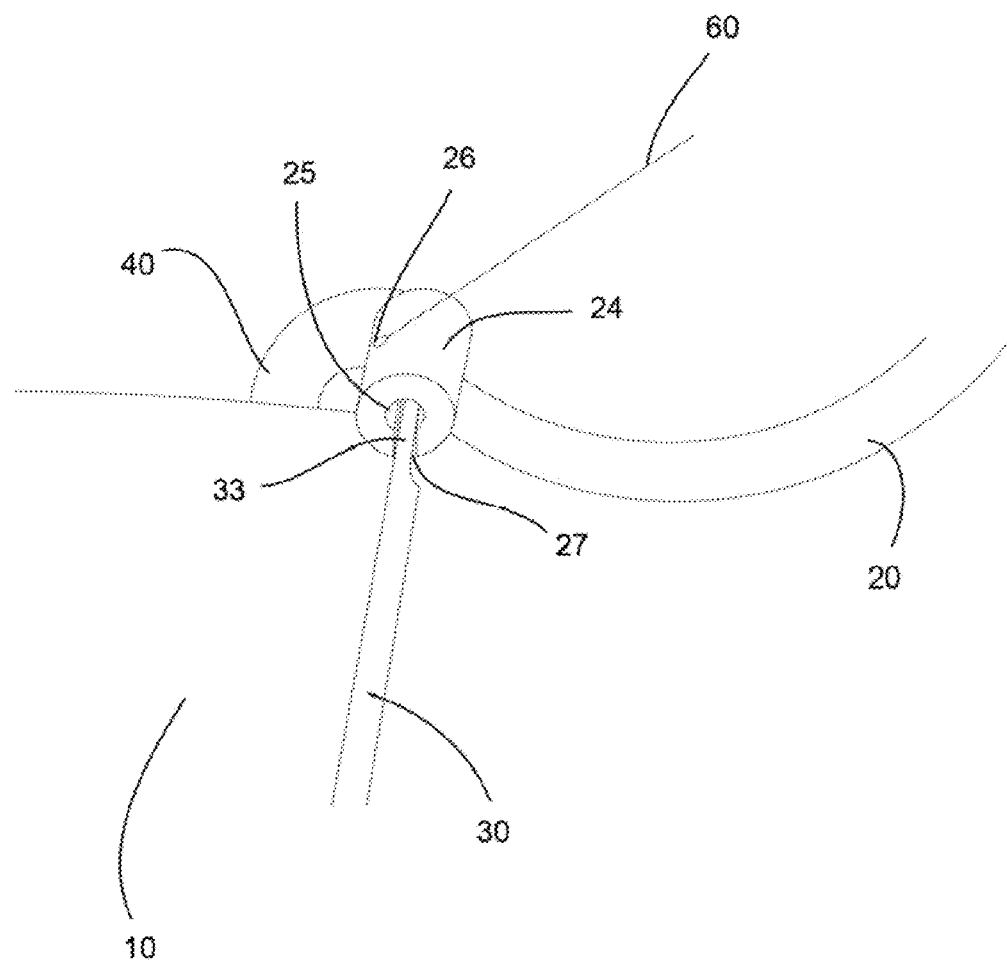
FIG. 4b illustrates a top perspective view of rail system cheese cutter apparatus with cutting arm being attached.

FIG. 4b illustrates a top perspective view of rail system cheese cutter apparatus 100 with cutting arm 20 being attached to rail 30. Slot 27 of rotational bearing 24 is inserted around milled portion 33 so that milled portion 33 rests in the opening 25. Cutting arm 20 can then be moved laterally along rail 30 and rotated. Cutting arm 20 is removable, and may be stored in a contour on the underside of arched cutting surface 10 when not in use.

Also visible is cavity 26 of rotational bearing 24 where spherical mass 62 of wire 60 rests.

Figure 5:
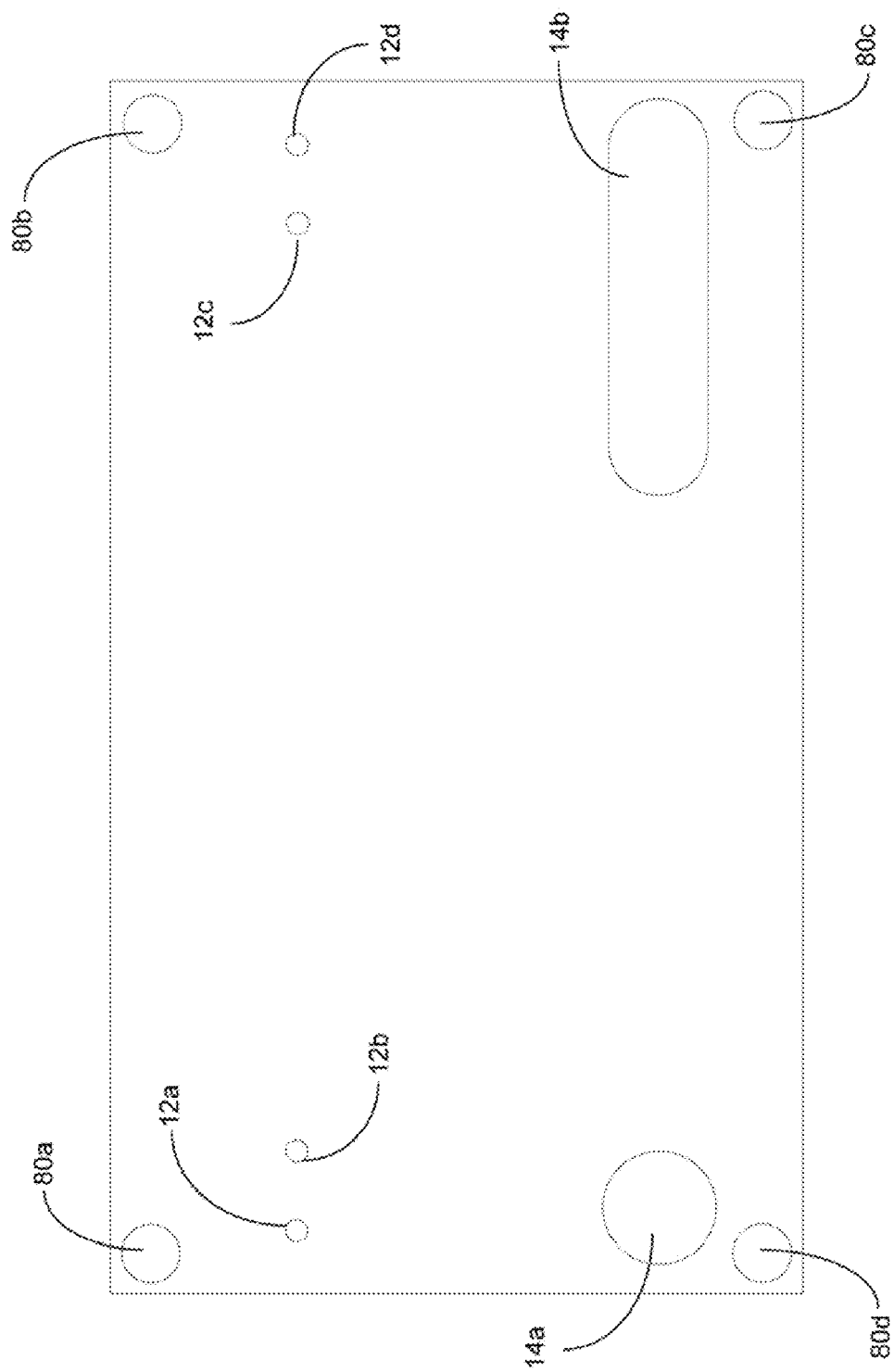
FIG. 5 illustrates a bottom view of the cutting surface of a rail system cheese cutter apparatus.

FIG. 5 illustrates a bottom view of arched cutting surface 10. In the embodiment shown, underside 11 of arched cutting surface 10 includes bores 12a, 12b, 12c, 12d for attaching right rail bracket 42 and left rail bracket 40 and rubber feet 80a, 80b, 80c, 80d to stabilize rail system cheese cutter apparatus 100 on a counter, table or other surface. In the embodiment shown, rubber feet 80 are round and approximately ¼ inch thick.

Underside 11 further includes recesses 14a, 14b for selectively attaching cutting arm 20. In the embodiment shown, recess 14a is shaped to accommodate rotational bearing 24 and recess 14b is shaped to accommodate gripping component attachment member 22 and gripping component and wire tensioning knob 53. Recesses 14 may be machined or formed pockets, cavities, apertures or contours adapted to receive portions of cutting arm 20.

Figure 6:
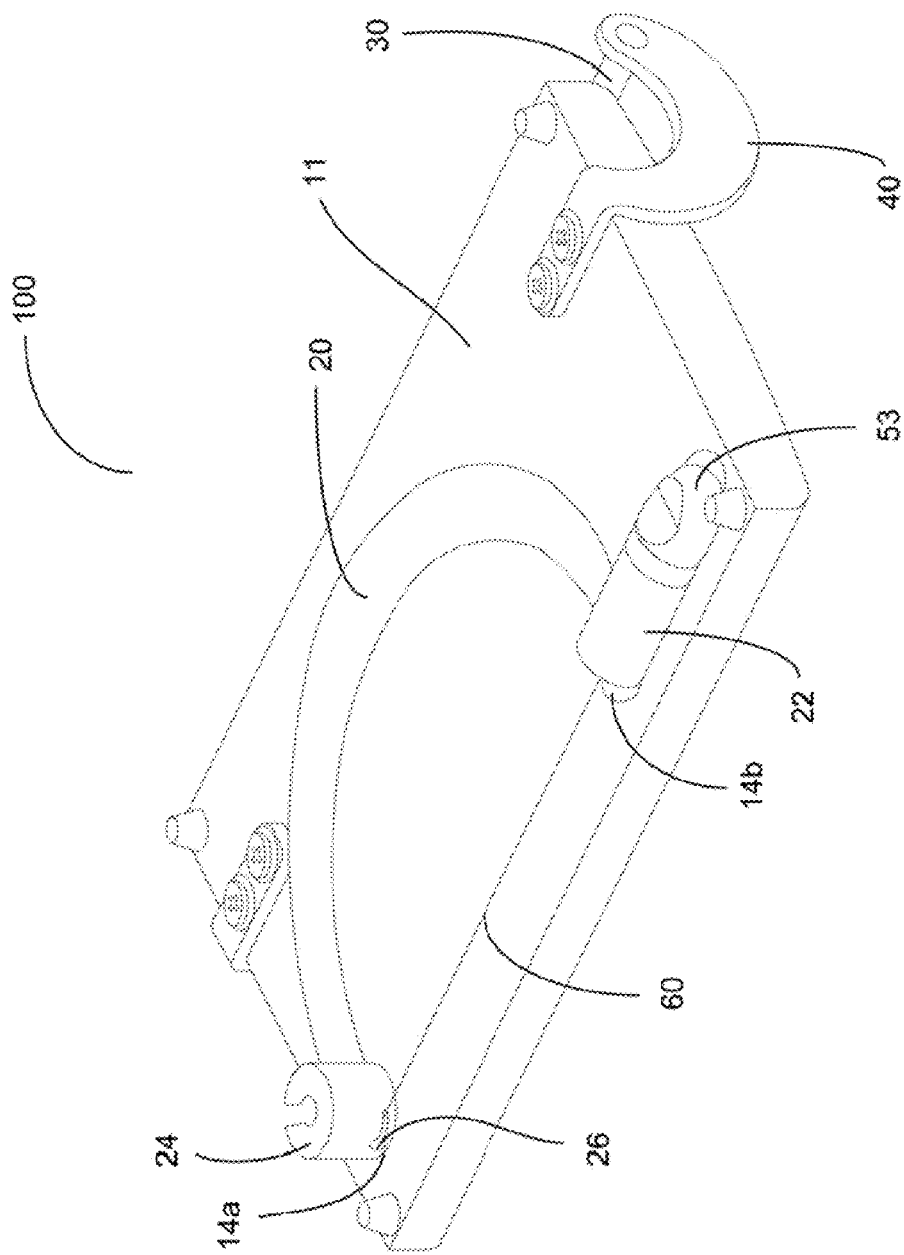
FIG. 6 shows a bottom view of the cutting surface of a rail system cheese cutter apparatus with cutting arm attached.

FIG. 6 shows a bottom view of arched cutting surface 10 of rail system cheese cutter 100 with cutting arm 20 attached to the underside of arched cutting surface 10. In the embodiment shown, rotational bearing 24 is resting in recess 14a and gripping component attachment member 22 and gripping component and wire tensioning knob 53 resting in recess 14b.

Figure 7:
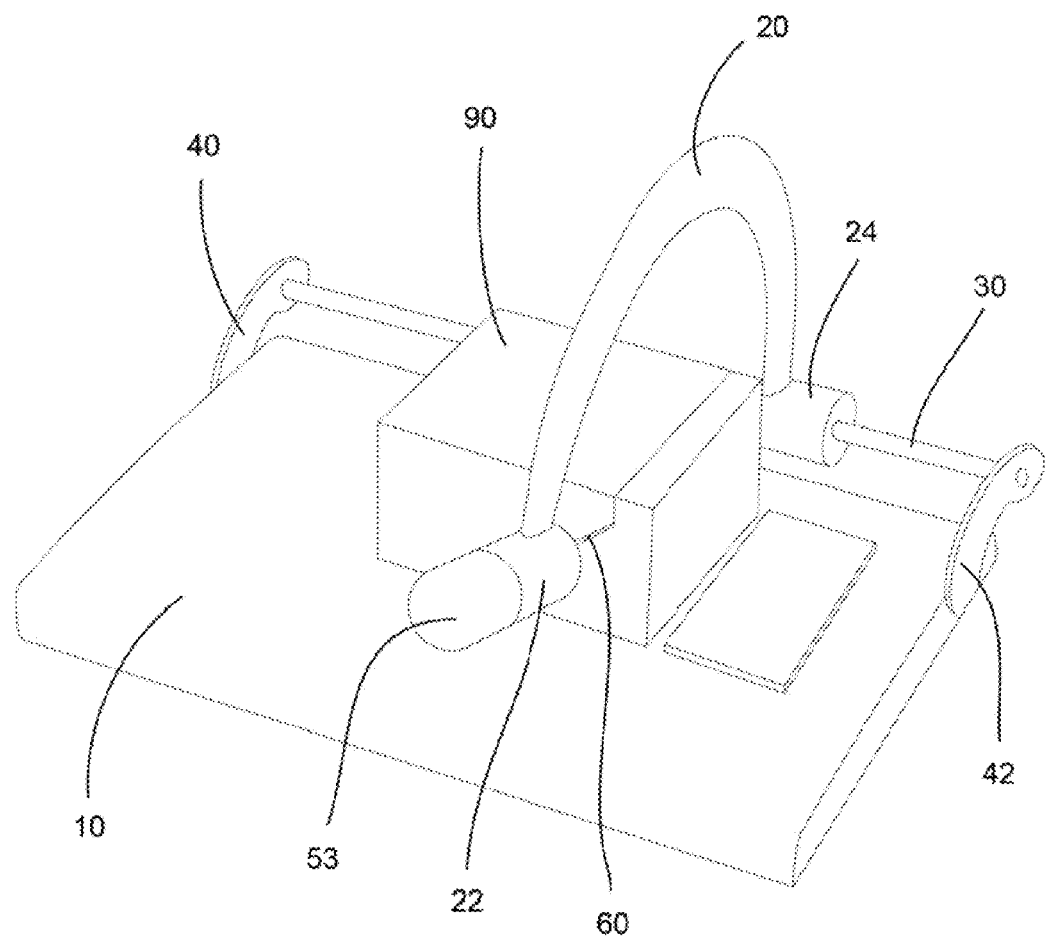
FIG. 7 shows a rail system cheese cutter apparatus cutting cheese.

FIG. 7 shows rail system cheese cutter 100 in use cutting a block of cheese 90 into slices.

What is claimed is:

1. A rail system cheese cutter apparatus comprising:
   an arched cutting surface having an upper surface and an underside;
   a rail;
   a first rail bracket and a second rail bracket;
   an arched pivotal arm into which a removable cutting wire is securely mounted;
   a rotational bearing attached to a first end of said arched pivotal arm;
   a gripping component attachment member attached to a second end of said arched pivotal arm;
   wherein said gripping component attachment member further includes an aperture; and
   a detachable gripping component;
   wherein said rail contains measurement indicia for cutting slices of a dimension conforming to said measurement indicia;
   wherein said rail includes a milled portion;
   wherein said milled portion is flattened for insertion into a slot within said rotational bearing;
   wherein said rotational bearing and said arched pivotal arm are a single component; and
   wherein said arched pivotal arm moves laterally along the rail and rotates about the rail.

2. The rail system cheese cutter apparatus of claim 1 wherein said aperture of said gripping component attachment member is square.

3. The rail system cheese cutter apparatus of claim 1 wherein said aperture of said gripping component attachment member is square to enable wire to be tensioned and not torqued.

4. The rail system cheese cutter apparatus of claim 1 wherein said underside of said arched cutting surface further includes at least one recess to accommodate storage of a component selected from a group consisting of said arched pivotal arm, said rotational bearing, said gripping component attachment member, said detachable gripping component and combinations thereof.

5. The rail system cheese cutter apparatus of claim 1 wherein said wire has a first integral spherical mass at a first end and a second integral spherical mass at a second end.

6. The rail system cheese cutter apparatus of claim 5 wherein said first spherical mass rests in a cavity in said rotational bearing.

7. The rail system cheese cutter apparatus of claim 5 wherein said second integral spherical mass is positioned inside a wire receptor with an attached wire tensioning screw which fits inside said aperture of said gripping component attachment member.

8. The rail system cheese cutter apparatus of claim 7 wherein said detachable gripping component is threaded onto said tensioning screw and the tension of said wire can be adjusted by turning said gripping component.

9. The rail system cheese cutter apparatus of claim 1 wherein one end of said rail is plug welded into a circular opening in said first rail bracket.

10. The rail system cheese cutter apparatus of claim 1 wherein said arched cutting surface is 0.75 inches thick.

11. The rail system cheese cutter apparatus of claim 1 wherein said arched cutting surface has a rise of 0.150 inches.

12. The rail system cheese cutter apparatus of claim 1 wherein said underside further includes feet to stabilize said apparatus on a surface.

13. The rail system cheese cutter apparatus of claim 1 wherein said detachable gripping component contains indentations to accommodate the user's thumb and forefinger.

* * * * *